US005243365A

United States Patent [19]

Christy et al.

[11] Patent Number: 5,243,365

[45] Date of Patent: Sep. 7, 1993

[54] POSITIVELY PURGED PRINT CARTRIDGE

[75] Inventors: Orrin D. Christy, N. Tonawanda; David J. Holler, deceased, late of Grand Island, both of N.Y., by Barbara A. Holler, legal representative

[73] Assignee: Moore Business Forms, Inc., Grand Island, N.Y.

[21] Appl. No.: 911,686

[22] Filed: Jul. 13, 1992

[51] Int. Cl.[5] .............................................. G01D 15/06

[52] U.S. Cl. ................................ 346/159; 315/111.81

[58] Field of Search .................... 346/159; 315/111.81

[56] References Cited

U.S. PATENT DOCUMENTS 4,890,123 12/1989 McCallum et al. ................. 346/159
4,918,468 4/1990 Miekka et al. ...................... 346/159
5,107,284 4/1992 Cyman et al. ....................... 346/159

*Primary Examiner*—George H. Miller, Jr.
*Attorney, Agent, or Firm*—Nixon & Vanderhye

[57] ABSTRACT

In electrostatic imaging utilizing a silent electric discharge, nitrogen or other controlled gas is supplied to the discharge region. First and second control fingers each having first and second ends and a number of active openings along their lengths, provide electrodes at the discharge region. The controlled gas is supplied to the discharge regions through first and second gas input channels each connected to either the first ends or second ends of both the control fingers. The charge output associated with the active openings in the control fingers is stabilized so that there is a substantially even distribution of charge output along the length of each control finger by providing first and second bleed holes associated with each of the control fingers, and closer to the gas input channel than are the active openings in the control fingers. Each bleed hole has a surface area of approximately three times that of a single active opening if each control finger has sixteen active openings, and the bleed holes are preferably formed in a screen electrode overlying the control fingers.

25 Claims, 2 Drawing Sheets

POSITIVELY PURGED PRINT CARTRIDGE

BACKGROUND AND SUMMARY OF THE INVENTION

IDAX AND MIDAX printing techniques are commercial electrographic imaging techniques that utilize what is referred to as silent electric discharge. In such systems, an ion cartridge is mounted adjacent an imaging drum. The drum then moves into contact with a transfer sheet (e.g. paper). The conventional cartridges utilized in these printing systems include first and second electrodes, typically called the driver and control electrodes, separated by a solid dielectric member, such as a sheet of mica. The control electrode, typically in the form of control fingers, defines an edge surface disposed opposite the driver electrode to define a discharge region at the junction of the edge surface and the solid dielectric member. An alternating potential is applied between the driver and control electrodes of sufficient magnitude to induce charged particle producing electrical discharges in the discharge region, and means are provided for applying a charged particles extraction potential between the control electrode and a further electrode, so that imaging occurs on the imaging drum, or dielectric paper or like dielectric moving past the ion cartridge. In most commercial installations a screen electrode is also provided, between the imaging drum and the control electrode, and separated by an insulating spacer from the control electrode. A commercial ion cartridge is typically constructed of a plurality of driver, control, and screen electrode units, in a matrix form.

In co-pending application Ser. No. 07/530,358 filed May 31, 1990, and in U.S. Pat. No. 4,918,468 (the disclosure of which is hereby incorporated by reference herein) in order to extend cartridge life, that is significantly put off ion cartridge failures that are euphemistically referred to as "red death", "white death", and "black death", a control gas, such as nitrogen, is supplied into the discharge region of the cartridge, and is injected from within the cartridge structure, creating a pure positive outflow of the gases from the cartridge. Even when the outflow is pure compressed air, it eliminates all electrically neutral internal gaseous contaminants from the plant environment (such as gases which cause ammonium nitrate and thus "white death"), and helps to deter contamination by uncontrolled toner particles (with resulting "black death").

The mechanism by which the gas is injected, according to the present invention, ensures optimum results. According to the present invention, a controlled gas (such as compressed air, but more preferably nitrogen, noble gases, or mixtures of noble gases or noble gases with nitrogen) is supplied to the discharge site or region, the discharge region having first and second control fingers (electrodes) each having first and second ends and a plurality of active openings therein at which active openings the discharges are formed. The controlled gas is supplied through first and second gas input channels are provided for each pair (the first and second) of control fingers, each gas input channel connected to either the first ends or the second ends of both the control fingers. Of course as many pairs of control fingers are provided as are necessary to provide a cartridge of desired size.

While the gas supply system described above is very beneficial, and effective, for some controlled gases, such as nitrogen, the charge output associated with the active openings and the control fingers is very uneven, being very high near the ends, and very low in the middle. Such unevenness is unacceptable, producing poor print quality, manifested in regularly spaced bands of alternating dark and light print regions which are easily recognized by the eye and which also produce machine scanned errors because of the uneveness. However according to the invention it is possible to stabilize the charge output so that there is a substantially even distribution of charge output along the length of each control finger. This is accomplished by providing first and second bleed holes associated with each of the first and second control fingers closer to the first and second gas input channels, respectively, than are the active openings in the control fingers. The bleed holes are preferably provided in a screen electrode overlying the control fingers, and having openings therein corresponding to (and substantially the same size as) the active openings in the control fingers. Where a single bleed hole is provided at each end of each control finger, and sixteen active openings are provided in each control finger, each of the bleed holes preferably has a surface area of approximately three times that of a single active opening.

It has also been surprisingly found that the cartridge output is enhanced slightly even with the injection of high pressure plain compressed air as the controlled gas when utilizing the bleed hole system and the control fingers, according to the invention. It has been suggested that such a phenomena may indicate that the positive outward flow of any gas, such as air, nitrogen, noble gases, or mixtures of each, alters the characteristics of charge extraction of the electrical fields determined by the control finger electrode, the screen electrode, and the dielectric imaging surface.

The invention also contemplates a method of generating charged particles for electrostatic imaging using a solid dielectric and first and second electrodes, with a discharge region. The method comprises the steps of: (a) Applying an alternating potential between the first and second electrodes to induce charged particle producing electrical discharges in the discharge region between the solid dielectric member and the first electrode. (b) Applying a charged particle extraction potential between the second electrode and a further member to extract charged particles produced by the electrical discharges. (c) Applying the external charged particles to a further member to form an electrostatic image. And, (d) supplying a controlled gas to the discharge site from opposite ends of the second electrode in such a manner as to stabilize the charge output so that it is substantially even along the discharge site.

The invention also comprises a silent electric discharge ion generating system including an ion discharge region including first and second control fingers each having first and second ends and a plurality of active openings therein, the ion discharges taking place at the edges of the active openings. The system comprises: Means for supplying controlled gas to the discharge site to displace at least some of the air at the discharge site during the generation of charged particles. The gas supplying means comprise first and second gas input channels, each connected to either the first ends or the second ends of the control fingers; and, means for stabilizing the charge output associated with the active openings in the control fingers so that there is a substantially even distribution of charge output along the length of each control finger.

It is the primary object of the present invention to provide for the effective extension of cartridge life for MIDAX printers, with good print quality. This and other objects of the invention will become clear from an inspection of the detailed description of the invention and from the appended claims.

DETAILED DESCRIPTION OF THE DRAWINGS

Figure 1:
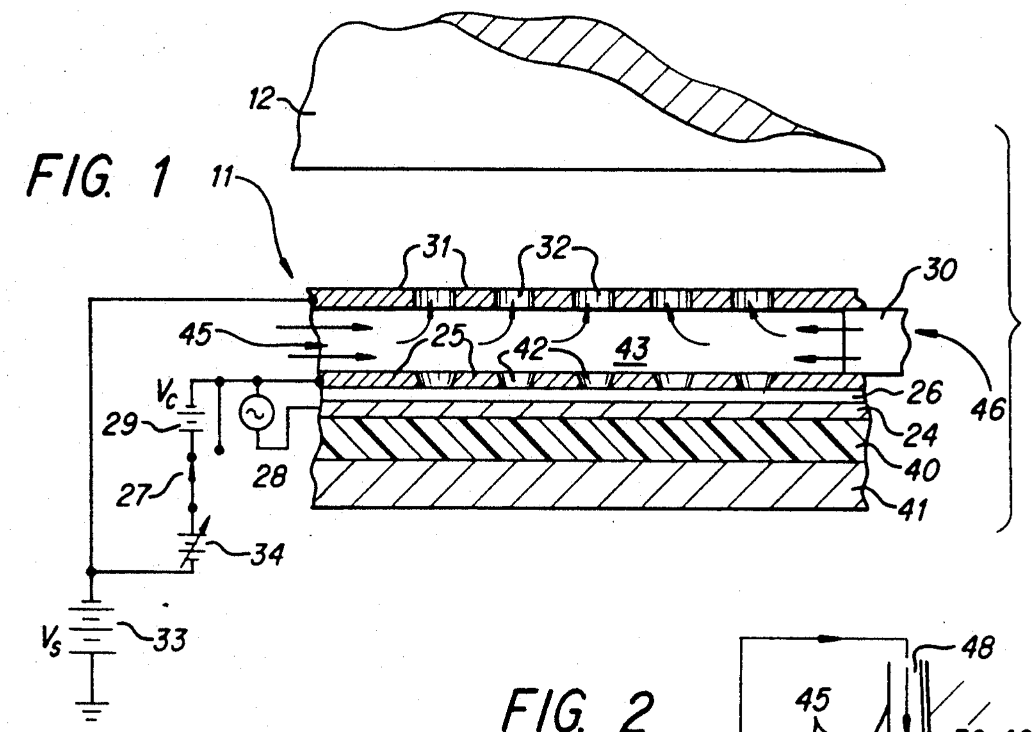
FIG. 1 is a sectional view, partly in elevational, of apparatus according to the present invention including a screen electrode and control electrode (finger),.

An exemplary silent electric discharge ("SED") ion generating system according to the present invention is shown generally by reference numeral 11 in FIG. 1, in association with an imaging drum 12 or the like for moving a dielectric, such as a dielectric belt or dielectric paper web or dielectric surface of the drum 12, past the SED apparatus 11. The imaging drum 12 is conventional, as are most of the components of the SED apparatus 11, and are shown in co-pending application Ser. No. 07/530,358 filed May 31, 1990 and U.S. Pat. No. 4,918,468 (the disclosure of which is hereby incorporated by reference herein).

In FIG. 1, only a small part of the SED apparatus 11 is illustrated. The SED apparatus includes an ion cartridge, such as shown in U.S. Pat. Nos. 4,155,093, 4,160,257, 4,267,556, and/or 4,381,327, which comprises a number of components in matrix form comparable to the components illustrated in FIG. 1 to provide electrostatic charges to the cylinder 12 or a dielectric belt or piece of paper moving therepast.

Figure 2:
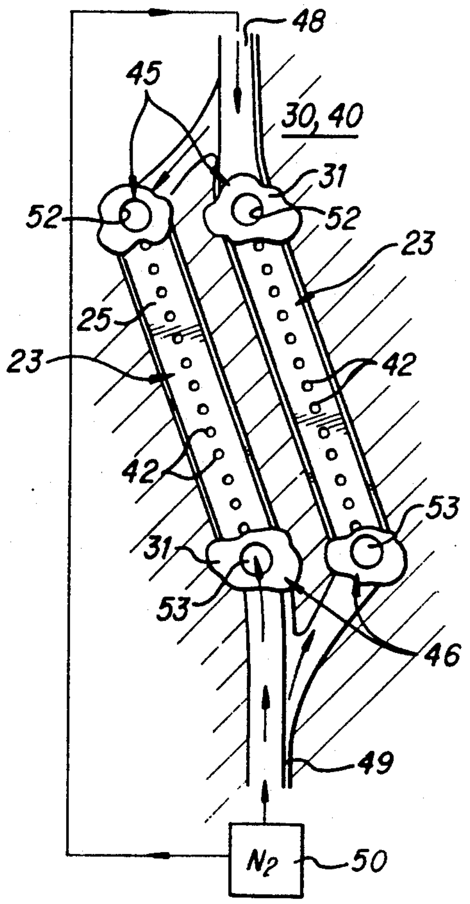
FIG. 2 is a top plan view of control fingers and related components of the apparatus of FIG. 1, with the screen electrode removed, except at the bleed holes, for clarity of illustration.

The major components of the apparatus 11 include a first or driver electrode 24 and a second or control electrode 25 typically formed by a plurality of control fingers—the control fingers shown schematically by reference numeral 23 in FIG. 2—and a solid dielectric member 26 disposed between the electrodes 24, 25.

A high voltage alternating potential 28 is applied between the driver and control electrodes 24, 25 to cause the formation of a pool or plasma of positive and negative charged particles in the "discharge region" adjacent the dielectric 26 at an edge surface of the control electrode 25 (i.e. at the peripheries of the active openings 42). The charged particles may be extracted to form a latent electrostatic image on a dielectric belt or web moving over the drum 12, or the drum 12 periphery itself. Charged particles of a given polarity may be extracted from the plasma by applying a bias potential formed by the combination of the controlling bias potential 34 and the electrode biasing potential 29, of appropriate polarity between the second electrode 25 and further electrodes, which may comprise the screen electrode 31 and the image drum 12 itself. In most commercial installations, a screen electrode 31 defining screen apertures 32 is provided spaced by an electrical insulator 30 from the second electrode 25. The screen voltage should be in a relatively narrow range, e.g. −400 to −900. The screen voltage is determined in part by the distance of the screen 31 from the drum 12.

As seen in FIG. 1, constant power supply 33 (typically a voltage of about −700) and variable power supply 34, and an electronic switch 27, are provided in addition to power supply 29 (typically a voltage of about −275). The power supply 34 typically has a range of about +200 to about +300 (e.g. about +250), which is adjustable to vary the charge output of the print cartridge giving control over the image contrast or darkness. When switch 27 is in the right (no-print) position in FIG. 1, the power supply 29 is bypassed, and there is a voltage of about −450 to the control electrode 25 (e.g. −700 +250 = −450). When the switch 27 is in the left position in FIG. 1, that is the print position, there is about a −715 voltage to control electrode 25 (e.g. −700+ +250+ −275 = −715). The screen electrode 31 provides an electrostatic lensing action preventing accidental image erasure and focussing of the electrostatic discharge onto the drum 12 periphery by structuring electrical fields which the output charges are directed within. In most commercial installations, a dielectric belt or web need not pass past the ion cartridge but rather the peripheral surface of the imaging drum 12 is dielectric, and that surface moves into operative association with a developing image medium and a receptor sheet, such as a paper sheet, which cooperates with a transfer roll.

FIG. 1 also illustrates a conventional backing insulator 40, which in turn is connected to an aluminum backbone 41, which are commonly used components of an SED device 11. The control fingers 23 have active openings 42 therein along the length thereof define the electrode 25.

According to the present invention, a controlled gas is supplied to the discharge region 43, where the ions are formed by an edge surface of the electrode 25 (at an active opening 42) at the junction of the edge surface with the solid dielectric member 26. The controlled gas flow according to the invention is at both ends 45, 46 of the region 43, the gas flow sweeping the discharge region 43 as illustrated schematically by the arrows in FIG. 1. FIG. 2 more clearly illustrates how the gas is supplied.

Formed in the structures 40, 41, and like supporting components, are first and second gas input channels 48, 49, respectively. The first input channel 48 communicates with the first ends 45 of the control fingers 23, while the second gas input channel 49 communicates with both the second ends 46 of the control fingers 23. The gas input channels 48, 49 are supplied with a controlled gas, such as nitrogen from the source 50 of compressed nitrogen. However instead of nitrogen, compressed air may be utilized (which surprisingly enhances cartridge output slightly compared to when the invention is not utilized), or the controlled gas may be elemental noble gases, mixtures of elemental noble gases, and mixtures of nitrogen with one or more elemental noble gases, such as argon. Of course the gases need not be pure since the provision of 100% pure gas is extremely difficult to obtain. However it is necessary that whatever gas is utilized be free of contaminants, such as benzene or vapors of numerous other organic solvents, which would facilitate a failure mode of the cartridge.

Figure 5:
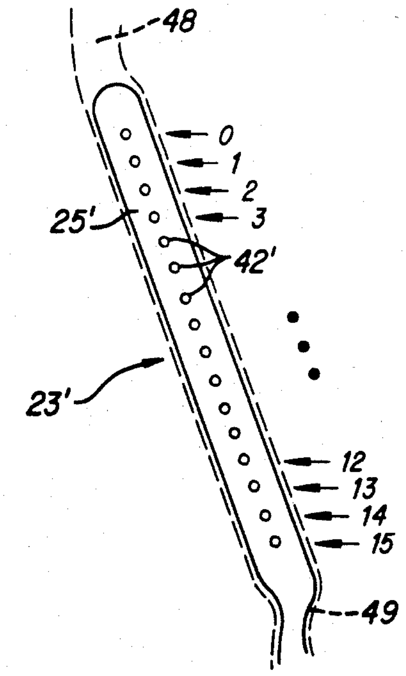
FIG. 5 is a schematic view showing a control finger, per se, without bleed holes.
Figure 6:
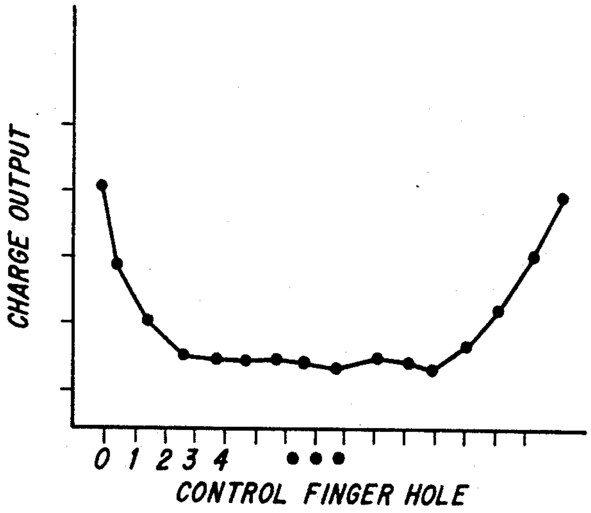
FIG. 6 is a graphical representation of the unevenness of the charge output if the control finger of FIG. 5 is utilized without bleed holes and nitrogen is supplied as the controlled gas.

Under some circumstances, particularly where nitrogen gas from source 50 is utilized, the distribution of charge output along the control fingers 23 is not even. For example, if a control finger 23'—such as illustrated in FIG. 5—is utilized, having sixteen active openings 42' along the length thereof, the charge output along the length of the control finger 23' will be very uneven, as illustrated in FIG. 6. Such unevenness of output from the electrode 25' is unacceptable. Such an unevenness will demonstrate regularly spaced bands of alternating dark and light print easily recognized by the eye and which would also produce errors in automatic machine scanning devices. The evenness of charge output needed must match that in the produced evenness of print, i.e. which across any given control finger 23, 23' of a printed spot size should vary less than +/− 0.0005 inches of the mean spot diameter.

Figure 3:
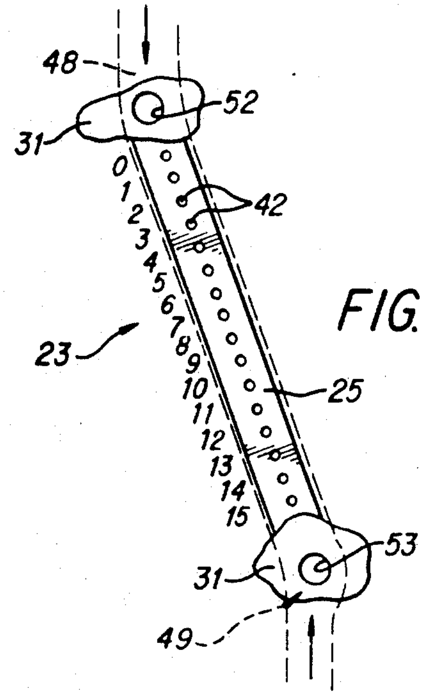
FIG. 3 is a schematic view illustrating a particular construction of control finger, and associated components, according to the invention as seen on the screen surface.
Figure 4:
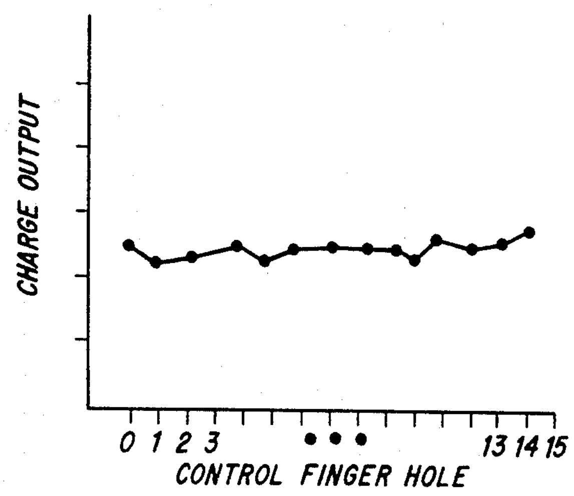
FIG. 4 is a graphical representation showing the evenness of the charge output utilizing the control finger of FIG. 3.

In order to overcome the charge distribution problem described above, according to the present invention one or more gas bleed holes 52, 53 are provided bored beyond the ends of the row of active charge producing openings 42 in each screen electrode 31, at each end thereof; that is the openings 52 are between the gas input channel 48 and the active openings 42 (see FIG. 2), while the gas bleed holes 53 are between the gas input channel 49 and the active openings 42. The cartridge as viewed from the screen surface (except at the holes 52, 53 where it is viewed from above the screen surface) thus looks as illustrated in FIG. 3, again with sixteen active openings 42. Utilizing the control finger 23, with the bleed holes 52, 53 in the screen electrode 31 as according to the invention, when nitrogen gas is supplied as the purge gas the charge output is very even along the length of the control finger 23, from opening 42 to opening 42, as illustrated in FIG. 4. The evenness of the charge of FIG. 4 is highly desirable.

Where sixteen active charge producing openings 42 are provided, and only one gas bleed hole 52, 53 is provided at each end of each control finger 23, the gas bleed holes 52, 53 each have approximately three times the surface area of a single normal active opening 42, or single screen electrode opening 32. Alternatively, a plurality of bleed openings 52, 53 could be provided associated with each control finger 23 end (in screen electrode 31) which collectively have a surface area of about three times the surface area of a single opening 42. If a control finger 23 has a different number of openings 42 than sixteen, then the optimum surface area of the bleed openings 52, 53 will not necessarily be three times a single opening 42 surface area, but may be more than three times or less than three times depending upon the number of openings 42.

The distance from the end of the active openings 42 to the bleed holes 52, 53 is not critical, but it is desirable to provide the gas bleed holes 52, 53 relatively close to the ends of the rows of active openings 42. While the mechanism for how the gas bleed holes 52, 53 achieve the desired even charge output is not fully understood, it is believed that they affect the gas pressure and velocity gradients in each row of active openings 42. By adjusting to a more level delivery of gas volume to each of the active openings 42, a more level and acceptable charge output from each of the active openings 42 on the finger 23 is realized.

In one typical example according to the present invention, sixteen openings 42 are provided each having a generally circular shape (with a slight taper inwardly from the surface closest to screen electrode 31 toward dielectric 26), with a diameter of about 0.0075 inches. The spacer 30 layer thickness is about 0.0045 inches, and the diameter of each circular screen hole 32 is 0.0075 inches (i.e. about the same as the diameter of an active opening 42).

It will thus be seen that according to the present invention an effective SED unit, and method, are provided which enhance cartridge life by minimizing the potential for "white death", "red death", and "black death", while still providing even charge output along the length of the control electrodes. While the invention has been herein shown and described in what is presently conceived to be the most practical and preferred embodiment it will be apparent to those of ordinary skill in the art that many modifications may be made thereof within the scope of the invention which scope is to be accorded the broadest interpretation of the appended claims so as to encompass all equivalent structures and processes.

What is claimed is:

1. Apparatus for generating charged particles for electrostatic imaging which comprises: a solid dielectric member; a first electrode substantially in contact with one side of said solid dielectric member; a second electrode substantially in contact with an opposite side of said solid dielectric member, with an edge surface of said second electrode disposed opposite said first electrode to define a discharge region at the junction of said edge surface and said solid dielectric member; means for applying an alternating potential between said first and second electrodes of sufficient magnitude to induce charged particle producing electric discharges in said discharge region between the dielectric member and the edge surface of said second electrode; means for applying a charged particle extraction potential between said second electrode and at least one further electrode; and wherein said second electrode comprises at least first and second control fingers each having a plurality of openings therein, and first and second ends; and means for supplying controlled gas to the discharge site to displace at least some of the air at said discharge site during the generation of charged particles; said gas supplying means comprising first and second gas input channels, each gas input channel connected to either said first ends or said second ends of both said first and second control fingers.

2. Apparatus as recited in claim 1 wherein said gas supplying means further comprises means for stabilizing the charge output associated with said active openings in said control fingers so that there is a substantially even distribution of charge output along the length of each control finger.

3. Apparatus as recited in claim 2 wherein said controlled gas of said gas supplying means consists essentially of nitrogen, elemental noble gases, mixtures of elemental noble gases, and mixtures of nitrogen with one or more elemental noble gases.

4. Apparatus as recited in claim 2 wherein said stabilizing means comprises first and second bleed holes formed in each of said first and second control fingers closer to said first and second gas input channels, respectively, than said active openings in said control fingers.

5. Apparatus as recited in claim 4 wherein each of said control fingers has sixteen active openings, and wherein a single bleed hole is associated with each end of each control finger, and wherein each of said bleed holes has a surface area of approximately three times that of a single active opening.

6. Apparatus as recited in claim 4 wherein the total surface area of said bleed holes is optimized depending upon the number of active openings in a control finger, so as to so to provide a substantially even distribution of charge output along the length of each control finger.

7. Apparatus as recited in claim 4 wherein said at least one further electrode comprises a screen electrode, and wherein said bleed holes are formed in said screen electrode.

8. Apparatus as recited in claim 2 wherein said controlled gas of said gas supplying means comprises nitrogen.

9. Apparatus as recited in claim 8 wherein said stabilizing means comprises at least first and second bleed holes associated with each of said first and second control fingers closer to said first and second gas input channels, respectively, than are said active openings in said control fingers.

10. Apparatus as recited in claim 9 wherein the total surface area of said bleed holes is optimized depending upon the number of active openings in a control finger, so as to so to provide a substantially even distribution of charge output along the length of each control finger.

11. Apparatus as recited in claim 9 wherein each of said control fingers has sixteen active openings, and wherein a single bleed hole is associated with each end of each control finger, and wherein each of said bleed holes has a surface area of approximately three times that of a single active opening.

12. Apparatus as recited in claim 11 wherein said at least one further electrode comprises a screen electrode, and wherein said bleed holes are formed in said screen electrode.

13. A method of generating charged particles for electrostatic imaging using a solid dielectric and first and second electrodes, with a discharge region, comprising the steps of:

(a) applying an alternating potential between the first and second electrodes to induce charged particle producing electrical discharges in the discharge region between the solid dielectric member and the second electrode;

(b) applying a charged particle extraction potential between the second electrode and a further member to extract charged particles produced by the electrical discharges;

(c) applying the external charged particles to a further member to form an electrostatic image; and (d) supplying a controlled gas to the discharge region from opposite ends of the second electrode in such a manner as to stabilize the charge output so that it is substantially even along the discharge site.

14. A method as recited in claim 13 wherein step (d) is further practiced by supplying nitrogen as the controlled gas.

15. A method as recited in claim 13 wherein step (d) is further practiced by supplying as the controlled gas a gas consisting essentially of nitrogen, elemental noble gases, mixtures of elemental noble gases, and mixtures of nitrogen with one or more elemental noble gases.

16. A method as recited in claim 13 wherein the second electrode comprises control fingers having a plurality of active openings therein, and wherein step (d) is practiced by supplying each control finger with controlled gas from opposite ends thereof, and providing bleed openings associated with each of the control fingers at the opposite ends thereof.

17. A method as recited in claim 16 wherein step (d) is further practiced by providing nitrogen as the controlled gas.

18. A method as recited in claim 16 wherein step (d) is further practiced by supplying as the controlled gas a gas consisting essentially of nitrogen, elemental noble gases, mixtures of elemental noble gases, and mixtures of nitrogen with one or more elemental noble gases.

19. A method as recited in claim 16 wherein step (d) is further practiced by providing sixteen active openings in each control finger, and by providing the bleed openings at each end of each control finger collectively having approximately three times the surface area of a single active opening in a control finger.

20. A method as recited in claim 19 wherein the further member comprises a screen electrode having openings therein corresponding to the openings in the control finger, and wherein step (d) is further practiced by providing the bleed openings in the screen electrode.

21. A silent electric discharge ion generating system including an ion discharge region having first and second control fingers each having first and second ends and a plurality of active openings at which ion discharges are formed, comprising means for supplying controlled gas to the discharge site to displace at least some of the gas at said discharge region during the generation of charged particles; said gas supplying means comprising first and second gas input channels, each connected to either said first ends or said second ends of said control fingers; and means for stabilizing the charge output associated with said active openings in said control fingers so that there is a substantially even distribution of charge output along the length of each control finger.

22. A system as recited in claim 21 wherein said stabilizing means comprises at least first and second bleed holes associated with each of said first and second control fingers and closer to said first and second gas input channels, respectively, than said active openings in said control fingers.

23. Apparatus as recited in claim 22 wherein the total surface area of said bleed holes is optimized depending upon the number of active openings in a control finger, so as to so to provide a substantially even distribution of charge output along the length of each control finger.

24. Apparatus as recited in claim 22 wherein each of said control fingers has sixteen active openings, and wherein a single bleed hole is associated with each end of each control finger, and wherein each of said bleed holes has a surface area of approximately three times that of a single active opening.

25. Apparatus as recited in claim 24 further comprising a screen electrode having an opening therein associated with each of said control finger active openings; and wherein said bleed holes are formed in said screen electrode.

* * * * *